(12) United States Patent
Lim (10) Patent No.: US 12,397,818 B2
(45) Date of Patent: Aug. 26, 2025

(54) AUTONOMOUS DRIVING ROBOT CONTROL SYSTEM AND ITS DRIVING METHOD

(71) Applicant: HL Robotics Co., Ltd., Seongnam (KR)

(72) Inventor: Joonhoo Lim, Yongin-si (KR)

(73) Assignee: HL Robotics Co., Ltd., Seongnam (KR)

( * ) Notice: Subject to any disclaimer, the term of this patent is extended or adjusted under 35 U.S.C. 154(b) by 352 days.

(21) Appl. No.: 17/902,389

(22) Filed: Sep. 2, 2022

(65) Prior Publication Data

US 2023/0072163 A1    Mar. 9, 2023

(30) Foreign Application Priority Data

Sep. 6, 2021    (KR) .................. 10-2021-0118415

(51) Int. Cl.
| | |
|---|---|
| B60W 60/00 | (2020.01) |
| B60W 50/14 | (2020.01) |
| G01C 21/00 | (2006.01) |

(52) U.S. Cl.
CPC .......... B60W 60/001 (2020.02); B60W 50/14 (2013.01); G01C 21/3807 (2020.08); G01C 21/3878 (2020.08); B60W 2050/146 (2013.01); B60W 2420/408 (2024.01); B60W 2556/40 (2020.02); B60W 2556/45 (2020.02)

(58) Field of Classification Search
None
See application file for complete search history.

(56) References Cited

U.S. PATENT DOCUMENTS

| | | | | |
|---|---|---|---|---|
| 7,653,384 | B2 * | 1/2010 | Yamada | G06Q 10/10 |
| | | | | 701/31.4 |
| 8,036,647 | B2 * | 10/2011 | Matsumura | H04L 67/52 |
| | | | | 455/414.3 |
| 9,269,178 | B2 * | 2/2016 | Piemonte | G01C 21/3638 |
| 11,989,892 | B2 * | 5/2024 | Okada | G06T 7/70 |
| 12,097,848 | B2 * | 9/2024 | Motoyama | G06V 10/22 |
| 2013/0117054 | A1 * | 5/2013 | Cooper | G06Q 10/083 |
| | | | | 705/7.12 |
| 2014/0172896 | A1 * | 6/2014 | Yu | G09B 29/106 |
| | | | | 707/758 |
| 2018/0188743 | A1 * | 7/2018 | Wheeler | G01C 21/30 |
| 2019/0035101 | A1 * | 1/2019 | Kwant | G06T 7/12 |
| 2020/0079504 | A1 * | 3/2020 | Hieida | G01C 21/005 |
| 2021/0140793 | A1 * | 5/2021 | Tickoo | G01C 21/3863 |
| 2021/0302982 | A1 * | 9/2021 | Yasui | B60W 30/09 |
| 2021/0349470 | A1 * | 11/2021 | McDaniel | G05D 1/0276 |
| 2022/0026920 | A1 * | 1/2022 | Ebrahimi Afrouzi | G06N 7/01 |

(Continued)

*Primary Examiner* — Hunter B Lonsberry
*Assistant Examiner* — Robert L Pinkerton
(74) *Attorney, Agent, or Firm* — Harvest IP Law, LLP (57) ABSTRACT

In an autonomous driving robot control system using a non-high definition map and a high definition map which is capable of operating a robot even in an area where the high definition map is not acquired, and a method of driving the same, the system includes: a control system; and a robot controlled according to an instruction from the control system, wherein the robot searches for a travel route based on the high definition map in a high definition map acquired area, and the robot searches for a travel route based on the non-high definition map in a high definition map unacquired area.

19 Claims, 11 Drawing Sheets

(56) References Cited

U.S. PATENT DOCUMENTS

| | | | |
|---|---|---|---|
| 2022/0196828 A1* | 6/2022 | Sorrentino | G01S 7/003 |
| 2022/0197301 A1* | 6/2022 | Moawad | G01S 7/2955 |
| 2023/0115708 A1* | 4/2023 | Xiang | G08G 1/16 701/23 |

* cited by examiner

AUTONOMOUS DRIVING ROBOT CONTROL SYSTEM AND ITS DRIVING METHOD

CROSS-REFERENCE TO RELATED APPLICATION

This application claims priority under 35 U.S.C. § 119 to Korean Patent Application No. 10-2021-0118415, filed on Sep. 6, 2021, in the Korean Intellectual Property Office (KIPO), the disclosure of which is incorporated by reference herein in its entirety.

1. Technical Field

Embodiments of the present disclosure relate to an autonomous driving robot, and in particular, to an autonomous driving robot control system using a non-high definition map and a high definition map that is capable of operating a robot even in an area where the high definition map is not acquired, and to a method of driving the same.

2. Discussion of Related Art

In general, an autonomous driving robot refers to a robot equipped with a power supply and a sensor in a main body and capable of autonomously driving without the supply of signals and power from the outside. The autonomous driving robot may handle various tasks such as a goods transport service within a building, a cleaning service inside the building, and a security service responsible for security inside the building.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Aspects of embodiments of the present disclosure may be directed to an autonomous driving robot control system using a non-high definition map and a high definition map which is capable of operating a robot even in an area where the high definition map is not acquired, and to a method of driving the same.

According to an embodiment, an autonomous driving robot control system using a non-high definition map and a high definition map includes: a control system; and a robot controlled according to an instruction from the control system, wherein the robot searches for a travel route based on the high definition map in a high definition map acquired area, and the robot searches for a travel route based on the non-high definition map in a high definition map unacquired area.

In some embodiments, the control system may create a combined map by combining the high definition map and the non-high definition map.

In some embodiments, the control system may display the combined map on a display unit of a controller configured to control the robot.

In some embodiments, the control system may create the combined map by overlapping the high definition map on the non-high definition map.

In some embodiments, the control system may obtain an area information from the non-high definition map based on a current location of the robot; create a background layer based on the obtained area information of the non-high definition map; select a high definition map corresponding to the current location of the robot from among a plurality of high definition maps; create a high definition map layer based on the selected high definition map; and create the combined map by overlapping the selected high definition map layer on the background layer with respect to the current location of the robot.

In some embodiments, the control system may create the background layer by graphicizing the obtained area information.

In some embodiments, the control system may create the high definition map layer by graphicizing the selected high definition map.

In some embodiments, the control system may add a travelable area and a non-travelable area of the robot to the high definition map layer overlapped on the background layer.

In some embodiments, the control system may converts the high definition map layer added with the travelable area and the non-travelable area into a TM coordinate system; create a grid high definition map by overlapping a grid layer on the high definition map layer in the TM coordinate system; set a travel route FOR the robot based on the grid high definition map; and transmit, to the robot, a robot travel control data including the travel route for the robot.

In some embodiments, when the robot travels in the high definition map unacquired area, the robot may collect data necessary for creating a high definition map of the high definition map unacquired area.

In some embodiments, the data required for creating the high definition map may include sensor data provided from a LIDAR (light detecting and ranging) sensor of the robot.

In some embodiments, the data required for creating the high definition map may further include an image data provided from an imaging unit of the robot.

In some embodiments, the data required for creating the high definition map may further include location data obtained from a locate estimator of the robot (e.g., a global navigation satellite system (GNSS) receiver, an inertial navigation system, etc.).

In some embodiments, the non-high definition map may include a navigation map.

In some embodiments, the navigation map may include at least one of an app-based map and an offline map.

In some embodiments, a first travel speed of the robot traveling based on the high definition map in a high definition map acquired area may be different from a second travel speed of the robot traveling based on the non-high definition map in the high definition map unacquired area.

In some embodiments, the second travel speed may be smaller than the first travel speed.

According to an embodiment, a method of driving an autonomous driving robot control system using a non-high definition map and a high definition map includes: a robot searching for a travel route based on the high definition map in a high definition map acquired area; and the robot searching for a travel route based on the non-high definition map in a high definition map unacquired area.

In some embodiments, the method may further include creating a combined map by combining the high definition map and the non-high definition map.

In some embodiments, the method may further include displaying the combined map on a display unit of a controller configured to control the robot.

In some embodiments, the method may further include overlapping the high definition map on the non-high definition map to create the combined map.

In some embodiments, creating of the combined map may include: obtaining an area information from the non-high definition map based on the current position of the robot; creating a background layer based on the obtained area information of the non-high definition map; selecting a high definition map corresponding to the current location of the robot from among a plurality of high definition maps; creating a high definition map layer based on the selected high definition map; and overlapping the selected high definition map layer on the background layer with respect to the current location of the robot.

In some embodiments, creating of the background layer may include creating the background layer by graphicizing the obtained area information.

In some embodiments, creating of the high definition map layer may include creating the high definition map layer by graphicizing the selected high definition map.

In some embodiments, the method may further include separately adding a travelable area and a non-travelable area for the robot to the high definition map layer overlapped on the background layer.

In some embodiments, the method may further include: converting the high definition map layer added with the travelable area and the non-travelable area into a TM coordinate system; creating a grid high definition map by overlapping a grid layer on the high definition map layer in the TM coordinate system; setting a travel route for the robot based on the grid high definition map; and transmitting, to the robot, a robot travel control data including the travel route for the robot.

In some embodiments, the method may further include: when the robot travels in the high definition map unacquired area, the robot collecting data necessary for creating a high definition map of the high definition map unacquired area.

The autonomous driving robot control system using the non-high definition map and the high definition map and the method of driving the autonomous driving robot control system according to the present disclosure may provide the following effects.

First, even in an area where the high definition map is not initially acquired, the robot's travel route is searched for using the non-high definition map such as an app-based map, so that the robot may travel even in the high definition map unacquired area.

Second, since a combined map in which the high definition map is overlapped on the non-high definition map, a precise and intuitively understandable map may be created.

Third, since information on the travelable and non-travelable areas may be added to the high definition map, the robot may be operated restrictedly within the travelable area, thereby providing a geo-fencing function.

The foregoing is illustrative only and is not intended to be in any way limiting. In addition to the illustrative aspects, embodiments and features described above, further aspects, embodiments and features will become apparent by reference to the drawings and the folnon-highing detailed description.

BRIEF DESCRIPTION OF THE DRAWINGS

A more complete appreciation according to an embodiment will become more apparent by describing in detail embodiments thereof with reference to the accompanying drawings, wherein.

DETAILED DESCRIPTION

Advantages and features of the present disclosure and methods of achieving them will become apparent with reference to the embodiments described below in detail in conjunction with the accompanying drawings. However, the present disclosure is not limited to the embodiments disclosed below, but will be implemented in a variety of different forms, only these embodiments allow the disclosure of the present disclosure to be complete and are provided to fully inform those skilled in the pertinent art, and the present disclosure is only defined by the scope of the claims. Accordingly, in some embodiments, well-known process steps, well-known device structures, and well-known techniques have not been specifically described in order to avoid obscuring the present disclosure. Like reference numerals refer to like elements throughout the specification.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined at the present specification.

Hereinafter, an autonomous driving robot control system using a non-high definition map (e.g., a non-detailed map, an imprecise map) and a high definition map (e.g., a detailed map, a precise map) according to the present disclosure and a method of driving the autonomous driving robot control system will be described in detail with reference to FIGS. 1 to 11.

Figure 1:
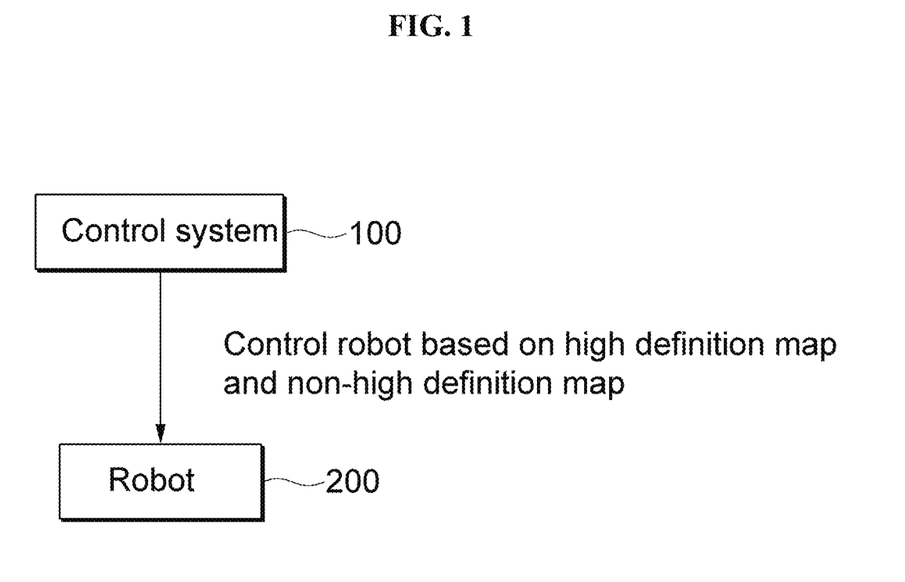
FIG. 1 is a block diagram illustrating an autonomous driving robot control system using a non-high definition map and a high definition map according to an embodiment of the present disclosure.
Figure 2:
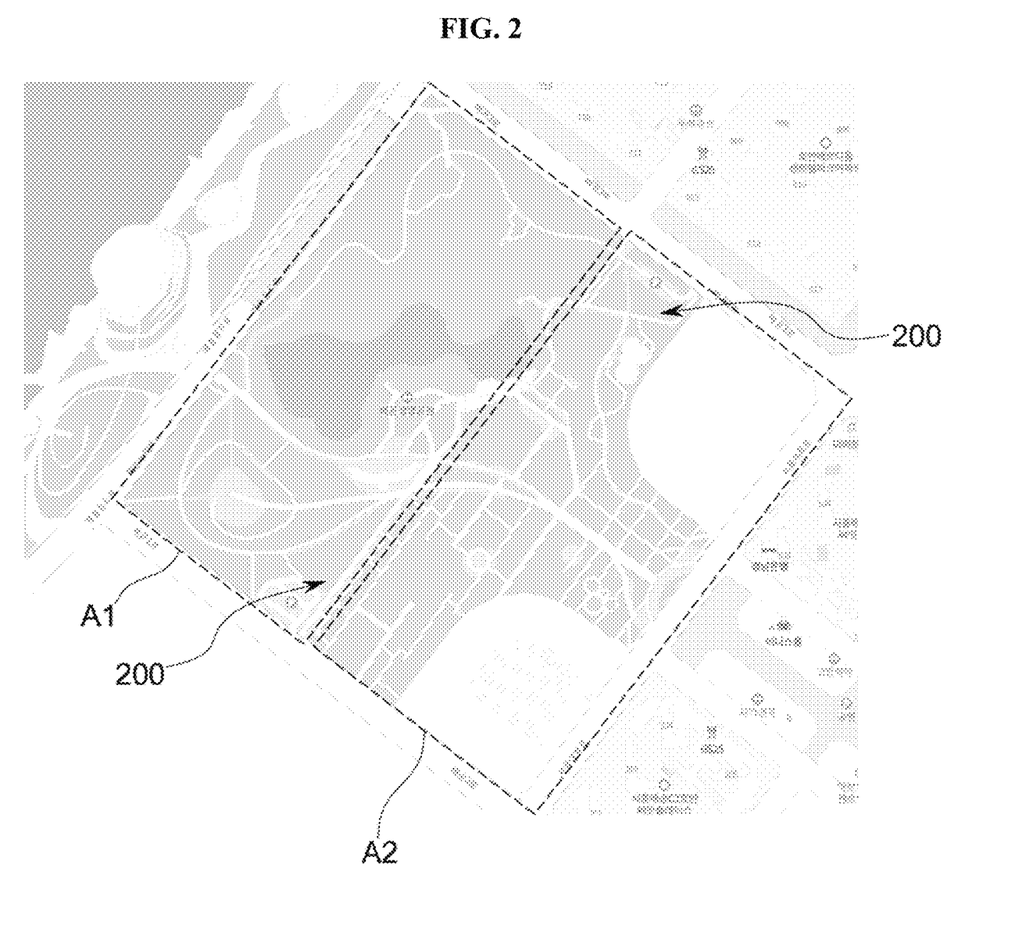
FIG. 2 is a view for explaining an operation of a robot in a high definition map acquired area and a high definition map unacquired area.

FIG. 1 is a block diagram illustrating an autonomous driving robot control system using a non-high definition map and a high definition map according to an embodiment of the present disclosure, and FIG. 2 is a view for explaining an operation of a robot 200 in a high definition map acquired area and a high definition map unacquired area.

An autonomous driving robot control system using a non-high definition map and a high definition map according to an embodiment of the present disclosure may include a control system 100 and a robot 200 as illustrated in FIG. 1.

The control system 100 controls an operation of the robot 200. For example, the control system 100 may control a travel route of the robot 200. To this end, as an example, the control system 100 may transmit an instruction signal to the robot 200 to control the travel route of the robot 200.

In an embodiment, the robot 200 may find a route (e.g., finding a route from a current location of the robot 200 to a destination) by using a map provided from the control system 100 or a map stored in advance in the robot 200.

A high definition map for some areas from among a plurality of areas located on a travel route of the robot 200 may not be acquired yet. For example, when a first area A1 and a second area A2 exist on the travel route from the current location of the robot 200 to the destination, as illustrated in FIG. 2, it may be assumed that a high definition map of the first area A1 is prepared and a high definition map of the second area A2 is not prepared yet. In such a case, the first area A1 may be defined as a high definition map acquired area, and the second area A2 may be defined as a high definition map unacquired area (e.g., a non-high definition map acquired area).

The robot 200 may search for a travel route by using the high definition map and the non-high definition map. In such a case, when setting the travel route of the robot 200 in the high definition map acquired area, the control system 100 may set the travel route of the robot 200 based on the high definition map of the high definition map acquired area. On the other hand, when setting the travel route of the robot 200 in the non-high definition map acquired area, the control system 100 may set the travel route of the robot 200 based on the non-high definition map of the non-high definition map acquired area. In such an embodiment, the non-high definition map may include, for example, a navigation map. The navigation map may include, for example, an app-based map and an offline map. The app-based map may include, for example, a map (e.g., a satellite map) provided by an Internet portal site. The above-mentioned non-high definition map may be a map based on latitude and longitude coordinates.

According to the control of the control system 100 as described above, the robot 200 in the high definition map acquired area searches for a travel route based on the high definition map corresponding to the high definition map acquired area, and the robot 200 in the high definition map unacquired area may search for a travel route based on the non-high definition map corresponding to the high definition map unacquired area. In other words, when the robot 200 is located in the high definition map acquired area, the robot 200 may perform a route finding within the high definition map acquired area based on the high definition map of the area. On the other hand, when the robot 200 is located in the high definition map unacquired area, the robot 200 may perform a route finding within the non-high definition map acquired area based on the non-high definition map of the area.

In an embodiment, all areas may initially be the high definition map unacquired area, and such high definition map unacquired areas may be changed to the high definition map acquired area according to the high definition map created based on exploration (or search) of the robot 200 to the area. In other words, the high definition map may be created for the high definition map unacquired area based on data collected by the robot 200 that explores (or searches) the area using the non-high definition map of the area. For example, in order to create a high definition map for a high definition map unacquired areas, the robot 200 may directly travel throughout the high definition map unacquired area and collect data on road structures and obstacles in the high definition map unacquired areas by using LIDAR (light detecting and ranging) sensor and the like provided in the robot 200. In such a case, the robot 200 may further include an imaging unit such as a front camera and an around view camera in addition to the lidar sensor, and the robot 200 may further collect data on traffic lanes, stop lines, and road signs by using such imaging units. In addition, by using a location information obtained from a location estimator of the robot 200, the image data obtained by the lidar and the imaging unit and a current location of the robot 200 may be matched and collected. The data collected by the robot 200 in such a manner may be transmitted to the control system 100.

The control system 100 may create the high definition map for the high definition map unacquired area based on the data transmitted from the robot 200 (e.g., data from the lidar sensor, or data collected by the lidar sensor and the imaging unit, and location information obtained from the location estimator).

In an embodiment, the robot 200 continuously collects data necessary for creating the high definition map even in the high definition map acquired area and transmits the data to the control system 100. Accordingly, the control system 100 may always keep the high definition map of the high definition map acquired area up to date.

The high definition map may be created based on latitude and longitude coordinates. In an embodiment, the high definition map based on the latitude and longitude coordinates may be converted into a high definition map based on Transverse Mercator (TM) coordinates through a converter.

In an embodiment, a travel speed of the robot 200 traveling based on the high definition map in the high definition map acquired area may be different from a travel speed of the robot 200 traveling based on the non-high definition map in the high definition map unacquired area. For example, the travel speed of the robot 200 in the high definition map unacquired area may be smaller than the travel speed of the robot 200 in the high definition map acquired area. Accordingly, it is possible to increase the accuracy of data collection of the robot 200 in the high definition map unacquired area, and to prevent an accident (an accident during traveling) of the robot 200 due to the low degree of precision of the non-high definition map.

Figure 3:
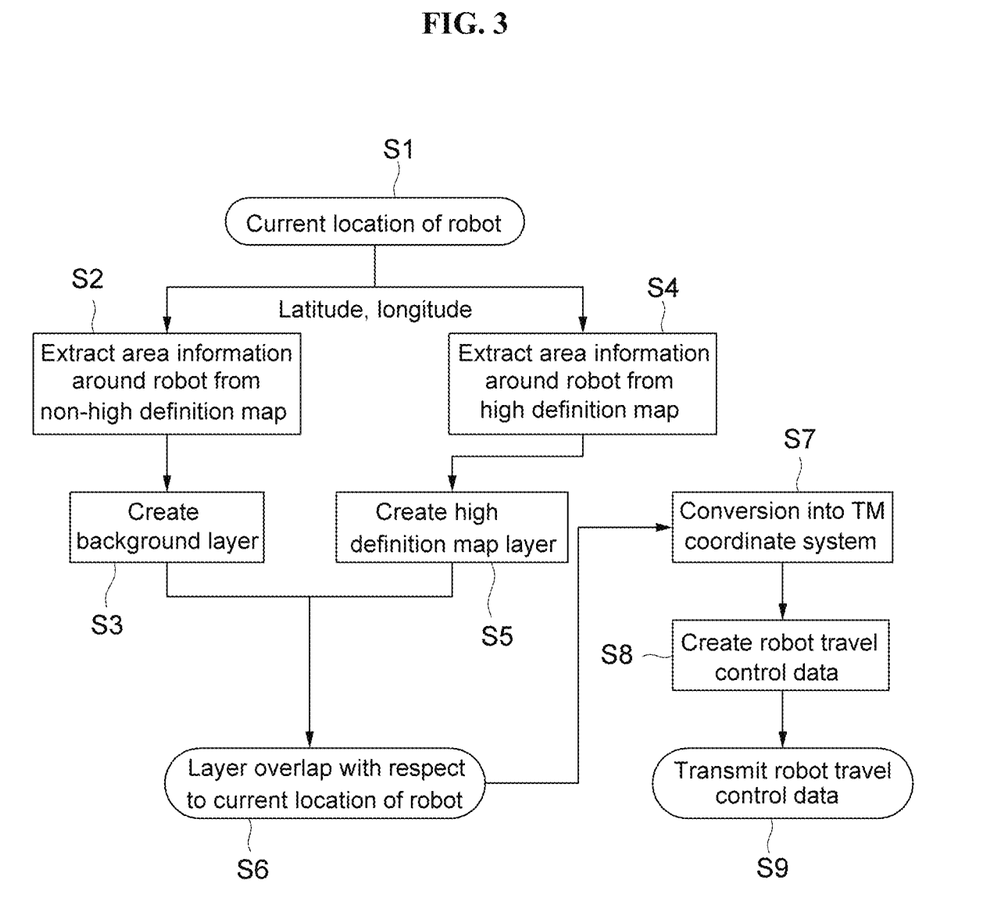
FIG. 3 is a flow chart illustrating a method for creating a combined map and a method for driving the robot.
Figure 4:
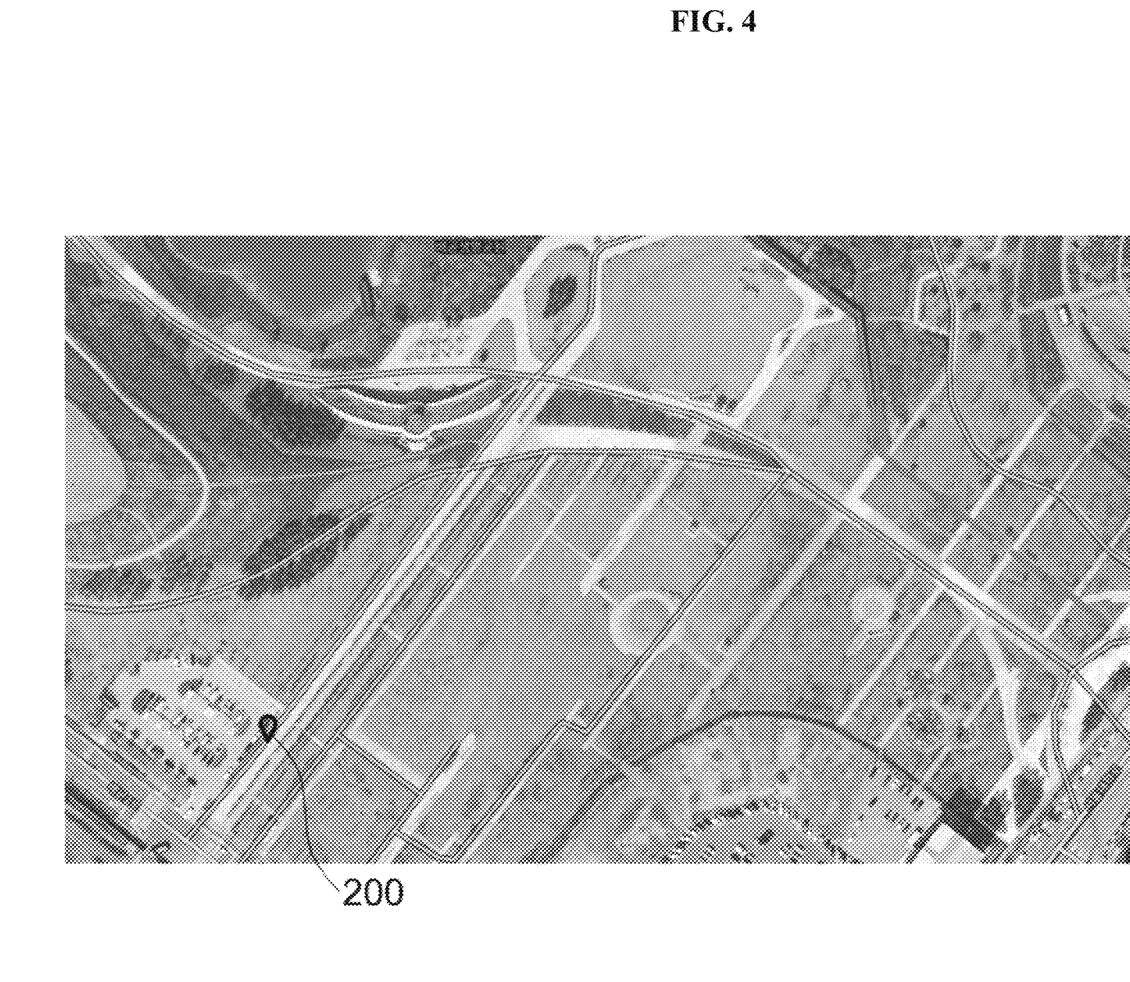
FIG. 4 is a view illustrating a non-high definition map.
Figure 5:
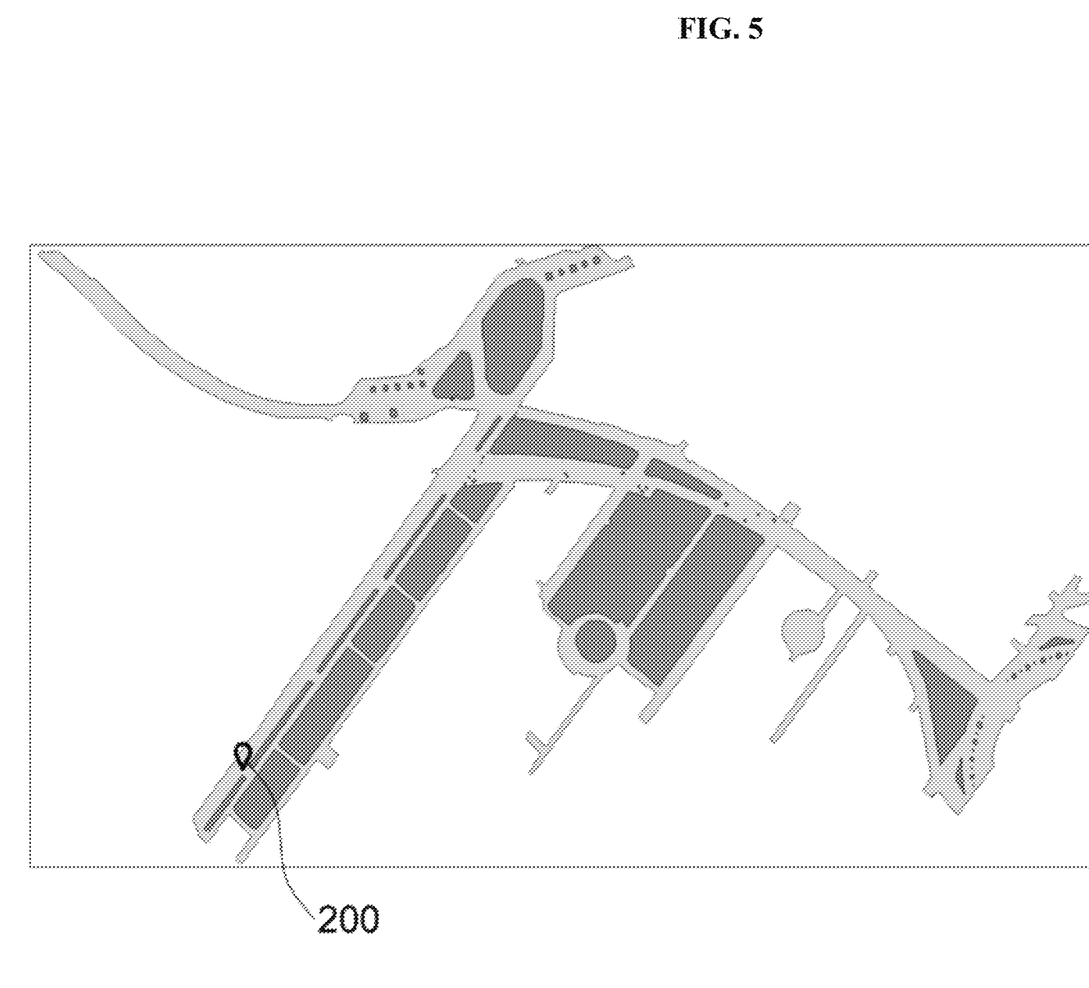
FIG. 5 is a view illustrating a high definition map.
Figure 6:
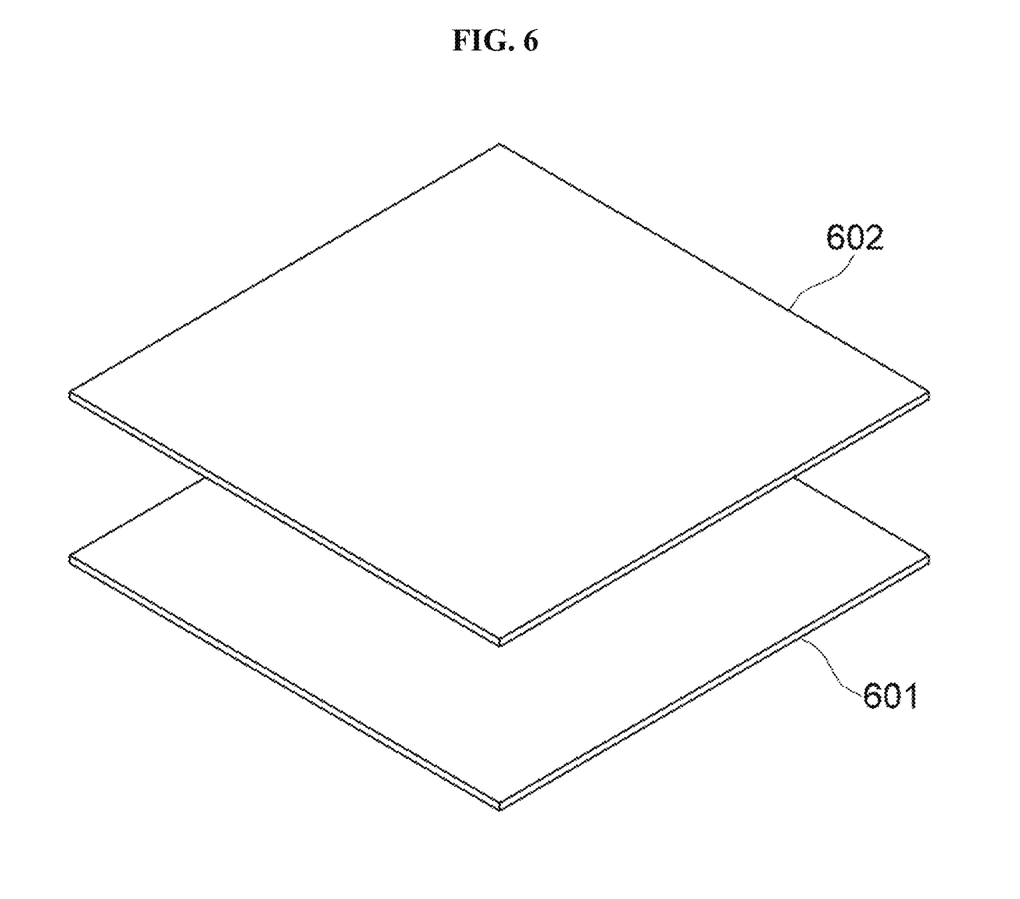
FIG. 6 is a view for explaining combining of the non-high definition map and the high definition map.
Figure 7:
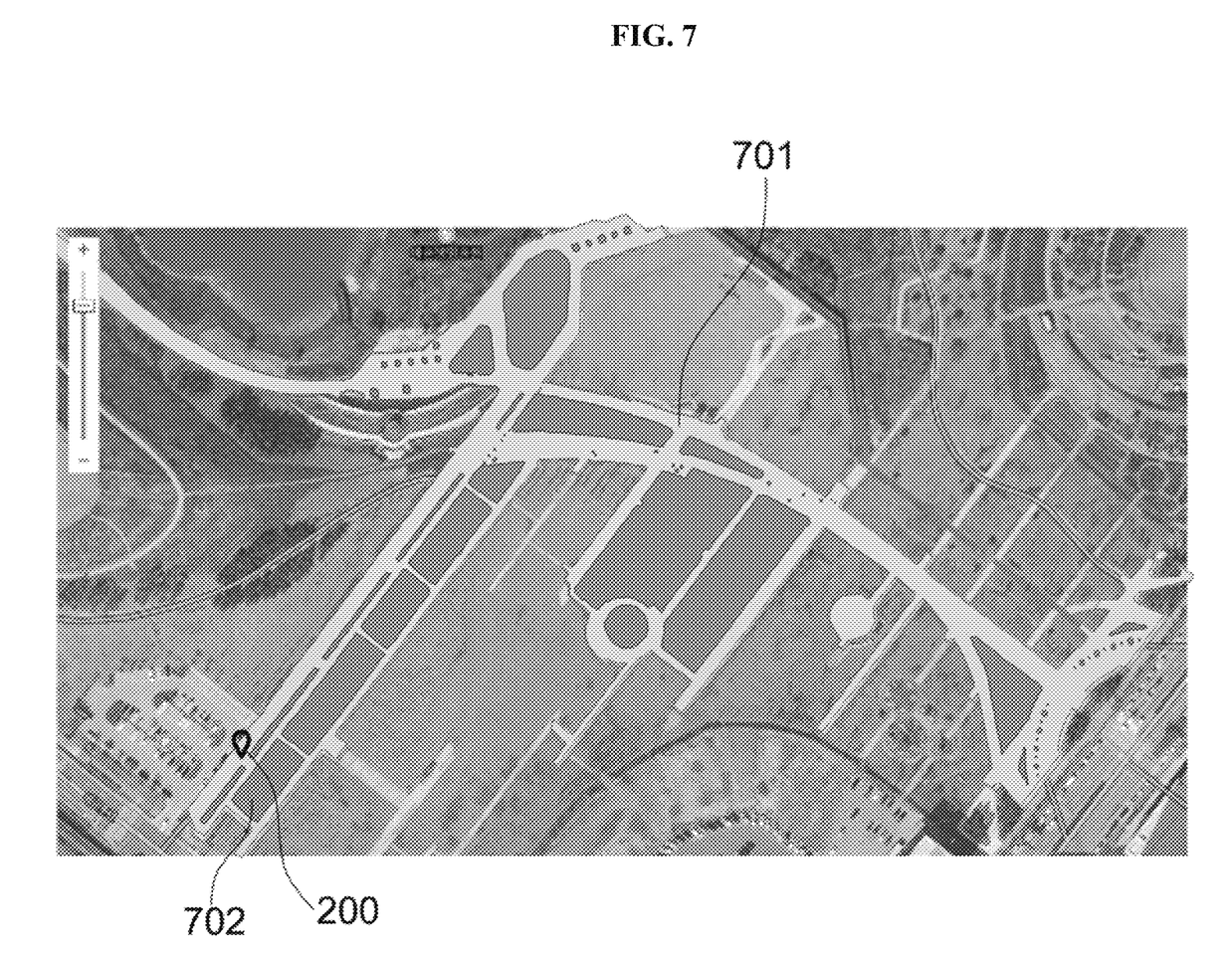
FIG. 7 is a view illustrating a combined map in which the non-high definition map and the high definition map of FIG. 6 are combined.
Figure 8:
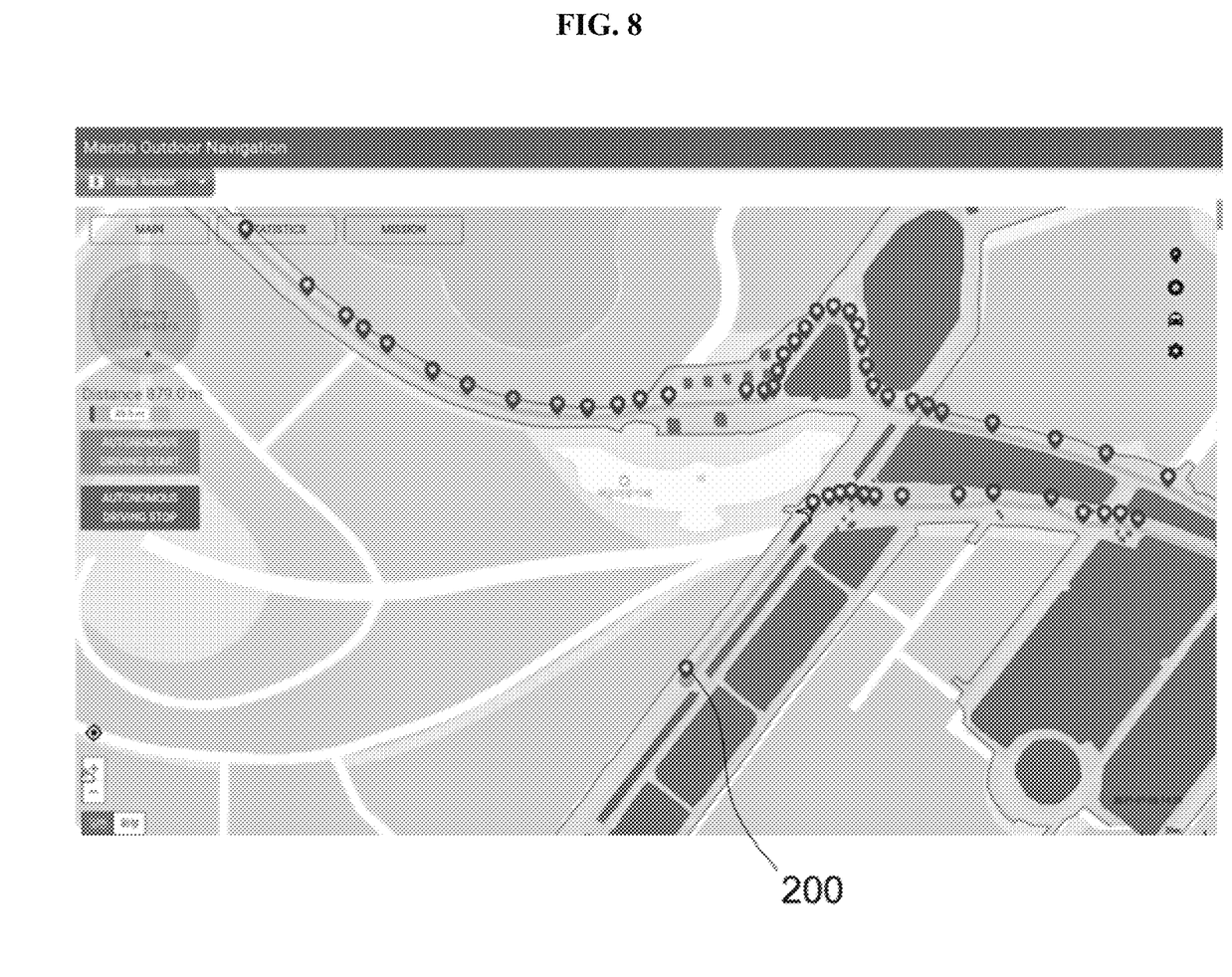
FIG. 8 is a view illustrating a screen of a display unit on which the combined map of FIG. 7 is displayed.
Figure 9:
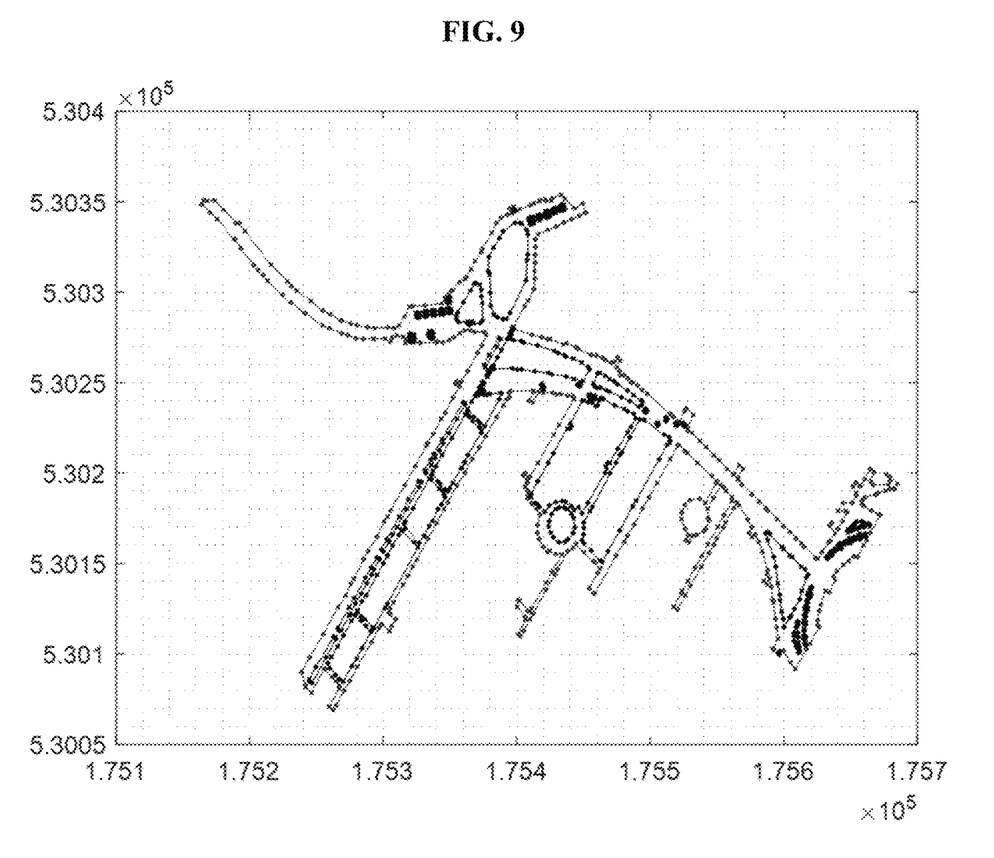
FIG. 9 is a view illustrating a grid high definition map.

FIG. 3 is a flow chart illustrating a method for creating a combined map and a method for driving the robot; FIG. 4 is a view illustrating a non-high definition map; FIG. 5 is a view illustrating a high definition map; FIG. 6 is a view for explaining combining of a non-high definition map and a high definition map; FIG. 7 is a view illustrating a combined map in which the non-high definition map and the high definition map of FIG. 6 are combined; FIG. 8 is a view illustrating a screen of a display unit on which the combined map of FIG. 7 is displayed; and FIG. 9 is a view illustrating a grid high definition map.

The control system 100 may create a new combined map by combining the high definition map and the non-high definition map and display the combined map on a display unit of a controller for controlling the robot 200. The controller may be included in, for example, the control system 100 located in a control center.

While the high definition map has the advantage of precisely displaying a location of the robot 200 in units of 10 cm (centimeter), it is difficult for ordinary people to intuitively understand. On the other hand, the non-high definition map such as a navigation map has the disadvantage of being somewhat inaccurate because the location of the robot 200 is displayed in units of 1 m (meter), but has an advantage that the general public may easily understand it.

The combined map may include the advantage of the high definition map and the advantage of the non-high definition map described above.

The combined map may be created by the control system 100. For example, as illustrated in FIG. 6, the control system 100 may overlap (e.g., superimposes) a high definition map layer 602 of the high definition map on a background layer 601 of the non-high definition map to obtain the above-described combined map.

A method of creating such a combined map will be described in more detail as follows.

First, as illustrated in FIG. 3, the control system 100 determines a current location of the robot 200 (S1). For example, the robot 200 may determine its location through a location estimator (e.g., Global Navigation Satellite System (GNNS), inertial navigation device, etc.) inside the robot 200, and when there is a request from the control system 100 to inquire about the current location of the robot 200, the robot 200 transmits its current location information to the control system 100. In such a case, the current location of the robot 200 may be expressed in latitude and longitude.

Then, the control system 100 obtains area information from the non-high definition map (e.g., the map of FIG. 4) based on the identified current location of the robot 200, as illustrated in FIG. 3 (S2). For example, the control system 100 searches for the identified current location of the robot 200 from the non-high definition map, and then extracts and obtains area information around the robot 200 from the non-high definition map. As used herein, the non-high definition map may be a map based on latitude and longitude coordinates.

Next, as illustrated in FIG. 3, the control system 100 creates the background layer (e.g., 601 in FIG. 6) based on the obtained area information of the non-high definition map (S3). For example, as a pre-work for combining the non-high definition map and the high definition map, to be described below, the control system 100 may create the background layer (601 in FIG. 6) by graphicizing (or visualizing) the area information of the non-high definition map.

Next, as illustrated in FIGS. 3 and 5, the control system 100 selects a high definition map (e.g., the map of FIG. 5) corresponding to the current location of the robot 200 from among a plurality of high definition maps. For example, since high definition maps are provided for each area, the control system 100 may select a high definition map including coordinates corresponding to the current location of the robot 200. Then, the control system 100 searches for the identified current location of the robot 200 from the selected high definition map, and then extracts and obtains the detailed area information around the robot 200 from the high definition map (S4). As used herein, the high definition map may be a map based on latitude and longitude coordinates.

Then, as illustrated in FIGS. 3 and 5, the control system 100 creates a high definition map layer (602 in FIG. 6) based on the detailed area information of the high definition map (S5). For example, as a pre-work for combining the non-high definition map and the high definition map, to be described below, the control system 100 creates a high definition map layer by graphicizing (or visualizing) the detailed area information.

Then, as illustrated in FIG. 6, the control system 100 overlaps the high definition map layer 602 on the background layer 601 with respect to the current location of the robot 200 to create the combined map (e.g., the combined map in FIG. 7). In such a case, the control system 100 matches coordinates of the background layer and coordinates of the high definition map layer so that the background layer 601 and the high definition map layer 602 may overlap each other in a properly aligned state. In an embodiment, when the coordinates of the current location of the robot 200 in the high definition map layer 602 and the coordinates of the current location of the robot 200 in the background layer 601 do not exactly match, the control system 100 may shift the high definition map layer 602 with respect to the background layer 601, such that the high definition map layer 602 and the background layer 601 may overlap in a properly aligned state.

Then, the control system 100 adds a travelable area (701 in FIG. 7) and a non-travelable area (702 in FIG. 7) to the high definition map layer 602 in the combined map. The travelable area refers to an area in which the robot 200 may travel, and the non-travelable area refers to an area in which the robot 200 may not travel. In FIG. 5, the travelable area 701 is an area marked in blue, and the non-travelable area 702 is an area marked in red. In such a case, the reason why the travelable area 701 and the non-travelable area 702 in the high definition map layer 602 are determined in a state where the high definition map layer 602 and the non-high definition map layer 601 (e.g., the background layer) overlap each other is because it is easier to determine the travelable area 701 and the non-travelable area 702 on the high definition map layer 602 in the overlap state. That is, since roads and obstacles are more easily recognized through the background layer 601, the travelable area 701 and the non-travelable area 702 on the high definition map layer 602 overlapped with the background layer 601 may be more easily distinguished. Through such a process, the high definition map layer 602 may further include information on the travelable area 701 and the non-travelable area 702. As used herein, the high definition map layer 602 including information on the travelable area 701 and the non-travelable area 702 will be defined as a final high definition map. This final high definition map is a map based on latitude and longitude coordinates. In an embodiment, the high definition map of the high definition map acquired area of FIG. 1 may be the above-described final high definition map.

As illustrated in FIG. 8, the combined map of FIG. 7 may be displayed on a screen of a display unit. On the screen of the display unit illustrated in FIG. 8, the combined map of FIG. 7 and the travel route of the robot 200 on the combined map may be displayed.

In an embodiment, the control system 100, as illustrated in FIG. 3, converts the final high definition map of the latitude and longitude coordinate system to create a final high definition map of a TM coordinate system (S7). In other words, the control system 100 converts the final high definition map layer including the travelable area information and the non-travelable area information described above into a high definition map in the TM coordinate system. To this end, the control system 100 may include a converter for converting a map using the latitude and longitude coordinate system into a TM coordinate system. Then, the control system 100 overlaps a grid layer on the final high definition map in the TM coordinate system. Accordingly, a grid-type high definition map (hereinafter, a grid high definition map) as illustrated in FIG. 9 may be created. In the grid high definition map of FIG. 9, an area within a red line means the aforementioned travelable area 701, and an area within a black line means the aforementioned non-travelable area 702.

The control system 100 sets a travel route of the robot 200 based on the grid high definition map in the TM coordinate system of FIG. 9 and extracts travel control data for the robot 200 based on the set travel route. The travel control data for the robot 200 includes the travelable area 701 and the non-travelable area 702, along with the travel route of the robot 200 based on the grid high definition map in the TM coordinate system described above.

The control system 100 transmits, to the robot 200, the extracted travel control data for the robot 200. Then, the robot 200 may travel to the destination (e.g., target point) along the travel route included in the travel control data.

Hereinbelow, a method of creating the above-described travel control data for the robot 200 will be described in detail with reference to FIGS. 9 and 10 described above.

Figure 10:
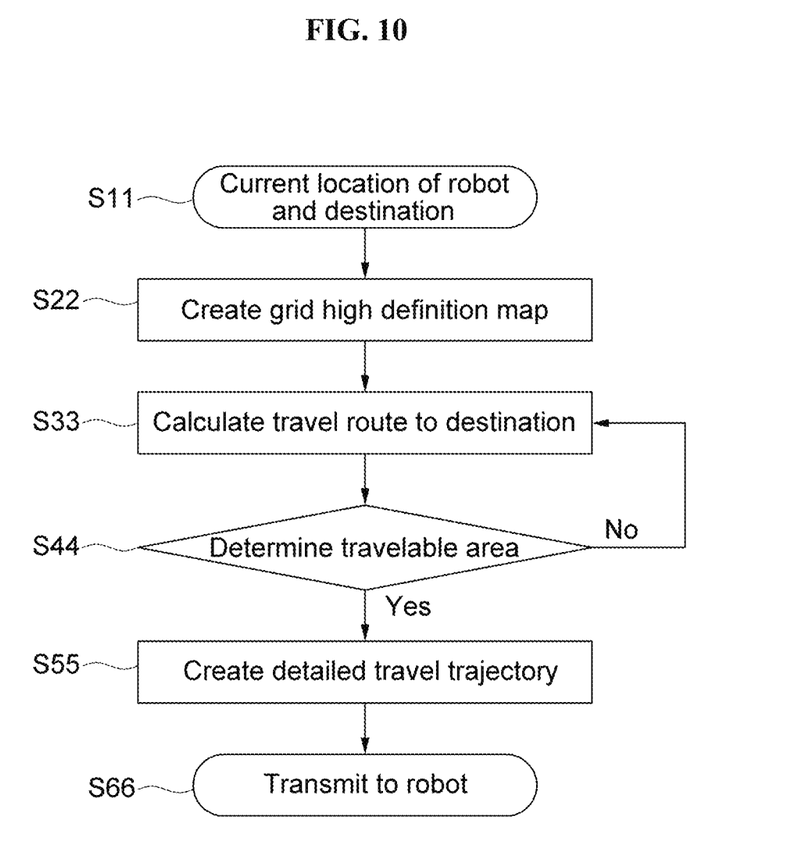
FIG. 10 is a flow chart illustrating a method for controlling traveling of a robot.

FIG. 10 is a flow chart illustrating a method for controlling traveling of the robot 200.

First, the control system 100 determines a current location of the robot 200 and a destination of the robot 200 (S11). In such a case, the control system 100 may determine the current location of the robot 200 from the location estimator of the robot 200.

Then, the control system 100 converts the final high definition map of the latitude and longitude coordinate system to create a high definition map in the TM coordinate system. Next, the control system 100 creates the grid high definition map as illustrated in FIG. 9 by overlapping a grid layer on the final high definition map in the TM coordinate system (S22).

Next, the control system 100 searches for (or calculates) a travel route to the destination (or a movement path) for the robot 200 based on the grid high definition map in the TM coordinate system (S33). In such a case, the control system 100 may search for the travel route for the robot 200 with respect to a straight-line distance on the grid of the grid high definition map in the TM coordinate system.

Then, the control system 100 checks whether the searched travel route includes only the travelable area (S44). When the searched travel route includes only the travelable area, the control system 100 creates a detailed travel trajectory based on the travel route (S55), and transmits, to the robot 200, the travel control data for the robot 200 including the created detailed travel trajectory (S66). In such an embodiment, the control system 100 may create the detailed travel trajectory for the robot 200 in a manner that a linear travel route trajectory is changed into a smooth curved shape in consideration of a movement radius and road condition of the robot 200. The travel route from the current location to the destination may be defined as a trajectory connecting straight lines on each grid of the high definition map, and the control system 100 may create the detailed travel trajectory described above by changing the straight line on each grid into a smooth curved shape.

On the other hand, when the searched travel route includes the non-travelable area 702, the control system 100 re-searches (or recalculated) a travel route to the destination for the robot 200 based on the high definition map in the TM coordinates system and repeats step S33 until the condition in step S44 is true. In such a case, when re-searching for the aforementioned route, the control system 100 may re-search only the route included in the non-travelable area 702 among the travel routes.

Figure 11:
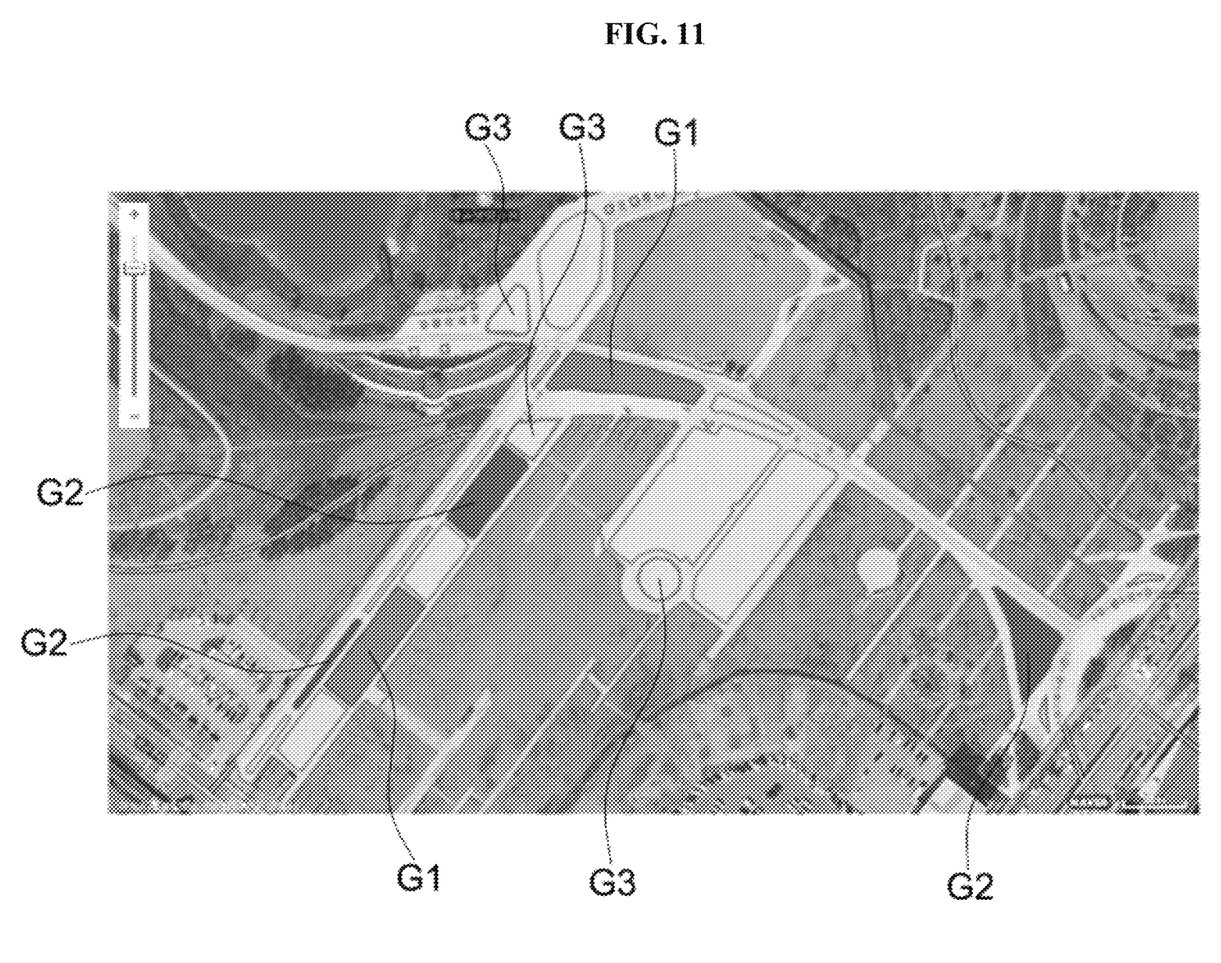
FIG. 11 is a view illustrating a combined map including areas in a multi-polygon method.

FIG. 11 is a view illustrating a combined map including areas in a multi-polygon method.

The travelable area and the non-travelable area described above may be formed in a multi-polygon manner.

For example, the non-travelable area 702 may be categorized into different groups of non-travelable areas according to the type of obstacles (e.g., an entrance bump, a bush, a road boundary stone, etc.) disposed in the non-travelable area 702. As a specific example, as illustrated in FIG. 11, the non-travelable area 702 may include a first group of non-travelable areas G1 marked in red, a second group of non-travelable areas G2 marked in blue, and a third group of non-travelable areas G3 marked in green, and each of the groups of non-travelable area G1, G2, and G3 may be formed of different polygons. Accordingly, each of the groups of non-travelable areas G1, G2, and G3 may be independently edited and modified. For example, the first group of non-travelable areas G1 may be edited and modified independently of the second group of non-travelable areas G2.

In an embodiment, although not illustrated, the travelable area 701 may also be categorized into a plurality of groups of travelable areas according to the shape of the road.

In an embodiment, each of the travelable area 701 and the non-travelable area 702 of the high definition map of FIG. 5 may be categorized in the multi-polygon method as illustrated in FIG. 11.

In such an embodiment, it will be understood that each block of the flow chart views and combinations of the flow chart views may be performed by computer program instructions. These computer program instructions may be embodied in a processor of a general-purpose computer, a special-purpose computer, or other programmable data processing equipment, such that the instructions executed by the processor of the computer or other programmable data processing equipment may create means to execute the functions described in the flowchart block(s). These computer program instructions may also be stored in a computer-usable or computer-readable memory that may direct a computer or other programmable data processing equipment to implement the functions in a particular manner, and thus the instructions stored in the computer-usable or computer-readable memory may produce an article of manufacture containing instruction means for performing the function described in the flow chart block(s). The computer program instructions may also be embedded in a computer or other programmable data processing equipment, and thus instructions serving a computer or other programmable data processing equipment by executing a series of operational steps on the computer or other programmable data processing equipment to produce a computer-executable process may provide the steps to execute the functions described in the flow chart block(s).

In addition, each block may represent a module, segment, or partial code that includes one or more executable instructions for executing specified logical function(s). It should also be noted that in some alternative embodiments, it is also possible for the functions recited in the blocks to occur out of order. For example, two blocks illustrated one after another may in fact be performed substantially simultaneously, or it is possible that the blocks are sometimes performed in the reverse order according to the corresponding function.

In such a case, the term '—unit' used in the present embodiment means software or hardware components such as FPGA or ASIC, and '—unit' performs certain roles. However, '—unit' is not limited to software or hardware. Herein, '—unit' may be configured to be embedded in an addressable storage medium or may be configured to refresh one or more processors. Accordingly, as an example, '—unit' may refer to components such as software components, object-oriented software components, class components, and task components, processes, functions, properties, procedures, subroutines, segments of program code, drivers, firmware, microcode, circuitry, data, databases, data structures, tables, arrays, and variables. The functions provided in the components and '—unit' may be combined into a smaller number of components and '—units' or further separated into additional components and '—units'. In addition, components and '—units' may be implemented to drive one or more CPUs in a device or a secure multimedia card.

Those of ordinary skill in the art to which this specification belongs will be able to understand that the present specification may be embodied in other specific forms without changing the technical spirit or essential features thereof. Accordingly, it should be understood that the embodiments described above are illustrative in all respects and not restrictive. The scope of the present specification is indicated by the claims described below rather than the detailed description, and all changes or modifications derived from the meaning and scope of the claims and their equivalent concepts are included in the scope of the present specification.

In the present specification and drawings, preferred embodiments of the present specification have been disclosed, and although specific terms are used, these are only used in a general sense to easily explain the technical content of the present specification and help the understanding of the invention, and it is not intended to limit the scope of the specification. It will be apparent to those of ordinary skill in the art to which this specification pertains that other modifications based on the technical spirit of the present specification may be implemented in addition to the embodiments disclosed herein.

What is claimed is:

1. An autonomous driving robot control system using a non-high definition map and a high definition map, the autonomous driving robot control system comprising:
   a control system; and
   a robot controlled according to an instruction from the control system,
   wherein the robot is configured to search for a travel route based on the high definition map in a first area where the high definition map has acquired, and the robot further configured to search for a travel route based on the non-high definition map including a navigation map in a second area where the high definition map has not acquired,
   wherein the high definition map is generated by,
   collecting, by the robot, necessary data for creating the high definition map while searching the second area, and
   creating, by the control system, the high definition map based on the collected data,
   wherein the second area where the high definition map is created is to be changed to the first area.

2. The autonomous driving robot control system of claim 1, wherein the high definition map is created based on the data comprising at least one of road structures, obstacles, traffic lanes, stop lines, and road signs.

3. The autonomous driving robot control system of claim 2, wherein the navigation map includes at least one of an app-based map and an offline map.

4. The autonomous driving robot control system of claim 1, wherein the data required for creating the high definition map includes sensor data provided from a LIDAR (light detecting and ranging) sensor of the robot.

5. The autonomous driving robot control system of claim 4, wherein the data required for creating the high definition map further includes at least one of image data provided from an imaging unit of the robot and location information obtained from a location estimator.

6. The autonomous driving robot control system of claim 1, wherein a first travel speed of the robot traveling based on the high definition map in the first area is different from a second travel speed of the robot traveling based on the non-high definition map in the second area.

7. The autonomous driving robot control system of claim 6, wherein the second travel speed is smaller than the first travel speed.

8. The autonomous driving robot control system of claim 1, wherein the control system is further configured to creates a combined map by combining the high definition map and the non-high definition map.

9. The autonomous driving robot control system of claim 8, wherein the control system is further configured to displays the combined map on a display unit of a controller configured to control the robot.

10. The autonomous driving robot control system of claim 8, wherein the control system is further configured to creates the combined map by overlapping the high definition map on the non-high definition map.

11. The autonomous driving robot control system of claim 10, wherein the control system is further configured to:
    obtains an area information from the non-high definition map based on a current location of the robot;
    creates a background layer based on the obtained area information of the non-high definition map;
    selects a high definition map corresponding to the current location of the robot from among a plurality of high definition maps;
    creates a high definition map layer based on the selected high definition map; and creates the combined map by overlapping the selected high definition map layer on the background layer with respect to the 5 current location of the robot.

12. The autonomous driving robot control system of claim 11, wherein the control system is further configured to creates the background layer by graphicizing the obtained area information.

13. The autonomous driving robot control system of claim 11, wherein the control system is further configured to creates the high definition map layer by graphicizing the selected high definition map.

14. The autonomous driving robot control system of claim 11, wherein the control system is further configured to adds a travelable area and a non-travelable area of the robot to the high definition map layer overlapped on the background layer.

15. The autonomous driving robot control system of claim 14, wherein the control system is further configured to:
    converts the high definition map layer added with the travelable area and the non-travelable area into a TM coordinate system;
    creates a grid high definition map by overlapping a grid layer on the high definition map layer in the TM coordinate system;
    sets a travel route FOR the robot based on the grid high definition map; and
    transmits, to the robot, a robot travel control data including the travel route for the robot.

16. A method of driving an autonomous driving robot control system using a non-high definition map and a high definition map, the method comprising:
    searching, by the robot, for a travel route based on the high definition map in a first area where the high definition map has acquired;
    searching, by the robot, for a travel route based on the non-high definition map in a second area where the high definition map has not unacquired;
    collecting, by the robot, necessary data for creating the high definition map while searching the second area; and
    creating, by the control system, the high definition map based on the collected data;
    wherein the second area where the high definition map is created to be changed to the first area.

17. The method of claim 16, further comprising:
creating a combined map by combining the high definition map and the non-high definition map.

18. The method of claim 17, further comprising:
displaying the combined map on a display unit of a controller configured to control the robot.

19. The method of claim 17, further comprising:
overlapping the high definition map on the non-high definition map to create the combined map.

* * * * *